(12) United States Patent
Martinez et al.

(10) Patent No.: US 11,156,311 B2
(45) Date of Patent: Oct. 26, 2021

(54) ARMOUR FOR FLEXIBLE PIPE COMPRISING A ONE-WAY COMPOSITE PROFILE SECTION AND A REINFORCING STRIP

(71) Applicant: IFP Energies nouvelles, Rueil-Malmaison (FR)

(72) Inventors: Michael Martinez, Saint Symphorien D'Ozon (FR); Alexandre Damiens, Berville-en-Caux (FR); Julien Maurice, Duclair (FR); Francois Grosjean, Charly (FR); Fabien Caleyron, Irigny (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 58 days.

(21) Appl. No.: 16/626,968

(22) PCT Filed: Jun. 19, 2018

(86) PCT No.: PCT/EP2018/066249
§ 371 (c)(1),
(2) Date: Dec. 27, 2019

(87) PCT Pub. No.: WO2019/002024
PCT Pub. Date: Jan. 3, 2019

(65) Prior Publication Data
US 2020/0224800 A1    Jul. 16, 2020

(30) Foreign Application Priority Data

Jun. 30, 2017 (FR) .................................. 17/56.144

(51) Int. Cl.
*F16L 11/02* (2006.01)
*B32B 1/08* (2006.01)
(Continued)

(52) U.S. Cl.
CPC ............... *F16L 11/02* (2013.01); *B32B 1/08* (2013.01); *B32B 5/024* (2013.01); *F16L 11/24* (2013.01);
(Continued)

(58) Field of Classification Search
CPC ......... F16L 59/02; F16L 58/16; F16L 11/081; Y10T 428/249942; Y10T 428/249928;
(Continued)

(56) References Cited

U.S. PATENT DOCUMENTS 5,645,109 A * 7/1997 Herrero ................. F16L 11/082
138/130
6,620,471 B1 * 9/2003 Do .......................... F16L 58/16
428/34.5

(Continued)

FOREIGN PATENT DOCUMENTS

EP        1066485 A1    1/2001

OTHER PUBLICATIONS

International Search Report for PCT/EP2018/066249, dated Jul. 13, 2018; English translation submitted herewith (6 pgs.).
(Continued)

*Primary Examiner* — Patrick F Brinson
(74) *Attorney, Agent, or Firm* — Fitch, Even, Tabin & Flannery, LLP

(57) ABSTRACT

A composite armour for a flexible pipe includes a composite profile and a reinforcement tape. The composite profile includes longitudinally oriented reinforcement fibres embedded in a polymer matrix. The reinforcement tape includes a woven tape comprising fibres impregnated with a polymer material, in such a way that the weft thread of the reinforcement tape is orthogonal to the longitudinal direction of the profile, and the warp thread is parallel to the longitudinal direction of the profile.

17 Claims, 1 Drawing Sheet

(51) Int. Cl.
  *B32B 5/02*   (2006.01)
  *F16L 11/24*  (2006.01)
(52) U.S. Cl.
  CPC ..... *B32B 2262/106* (2013.01); *B32B 2597/00* (2013.01)
(58) Field of Classification Search
  CPC ... Y10T 428/249945; Y10T 428/24994; Y10T 428/249929
  USPC .......... 138/134, 137, 140; 428/293.4, 293.7, 428/297.4, 298.1, 299.1, 299.7
  See application file for complete search history.

(56) References Cited

U.S. PATENT DOCUMENTS

| | | | | |
|---|---|---|---|---|
| 7,530,372 B2* | 5/2009 | Gerez | ................... | F16L 11/082 138/134 |
| 2004/0060610 A1* | 4/2004 | Espinasse | ............. | F16L 11/083 138/134 |
| 2011/0036441 A1* | 2/2011 | Jung | ...................... | F16L 11/16 138/132 |

OTHER PUBLICATIONS

N.N.: "CFK Carbon Platten 1,5mm, Hightec-Line Carbon-Shop.at", Jan. 1, 2014 (Jan. 1, 2014), XP055459043, Retrieved from the Internet: URL:http://www.carbon-shop.at/produkt/cfk-carbon-platten-1mm-hightec-line#.WqfweGfdcSk [retrieved on Mar. 13, 2018].

* cited by examiner

ARMOUR FOR FLEXIBLE PIPE COMPRISING A ONE-WAY COMPOSITE PROFILE SECTION AND A REINFORCING STRIP

CROSS-REFERENCE TO RELATED APPLICATIONS

This application is a U.S. national phase application filed under 35 U.S.C. § 371 of International Application No. PCT/EP2018/066249, filed Jun. 19, 2018, designating the United States, which claims priority from French Patent Application No. 17/56.144, filed Jun. 30, 2017, which are hereby incorporated herein by reference in their entirety.

FIELD OF THE INVENTION

The present invention relates to longitudinal tensile reinforcement layers (generally referred to as armours) for a flexible tubular pipe, in particular for petroleum fluid transport. The flexible pipe can be used in the field of offshore oil exploitation.

The flexible pipes addressed by the present invention consist of an assembly of different concentric and superimposed layers, referred to as unbonded because these layers have a certain freedom to move relative to one another during a bending stress undergone by the flexible pipes. These flexible pipes meet, among other things, the recommendations of the normative documents API 17J "Specification for Unbonded Flexible Pipe" ($4^{th}$ Edition, May 2014) and API 17B "Recommended Practice for Flexible Pipe" ($5^{th}$ Edition, May 2014) published by the American Petroleum Institute. The constituent layers of the flexible pipes notably comprise polymer sheaths generally providing a sealing function, and reinforcement layers designed to take up the mechanical stresses, made up of windings of metal strips, metal wires, various tapes or profiles made from composite materials.

These flexible pipes are notably used for transporting oil or gas type hydrocarbons from a subsea equipment located on the seabed, a wellhead for example, to a floating production unit located at the surface. Such pipes can be deployed at great depths, commonly more than 2000 m, and they must therefore be able to withstand a hydrostatic pressure of several hundred bars. Furthermore, they must also withstand the very high pressure of the hydrocarbons transported, and this pressure can also reach several hundred bars.

When the flexible pipe is in service, it can be subjected to high static and dynamic loads, which may generate a fatigue phenomenon. The most severe loads are generally observed in the upper part of the riser pipes connecting the seabed to the surface. Indeed, in this area, the flexible pipe undergoes a high static tensile stress related to the weight of the pipe, coupled with dynamic tensile and transverse bending stresses related to the motion of the floating production unit under the effect of the swell and the waves. Regarding the part of the flexible pipe extending on the seabed (flowline), the loads applied are essentially static.

The most commonly used unbonded flexible pipes in the offshore petroleum industry generally comprise, from inside to outside, an inner carcass consisting of a strip made from stainless steel profiles and helically wound with a short pitch as coils stapled to one another, the purpose of said inner carcass being mainly to prevent collapse of the flexible pipe under the effect of the external pressure, an inner polymer sealing sheath, a pressure vault consisting of at least one clipped metal wire helically wound with a short pitch, said pressure vault being intended to take up the radial stresses related to the internal pressure, tensile armour layers consisting of long-pitch helical windings of metal wires or composite profiles, said tensile armour layers being intended to take up the longitudinal stresses undergone by the flexible pipe, and finally an outer sealing sheath intended to protect the reinforcement layers from the sea water. In the present application, short-pitch winding refers to any coil having a helix angle whose absolute value is close to 90 degrees, in practice ranging between 70 degrees and 90 degrees to the longitudinal axis of the flexible pipe. The term long-pitch winding refers to any coil whose helix angle is, in absolute value, less than or equal to 55 degrees to the longitudinal axis of the flexible pipe.

The inner carcass provides sufficient collapse strength for the flexible pipe to be able to withstand high external pressures, notably the hydrostatic pressure when the flexible pipe is submerged at great depth (1000 m, or 2000 m, or even more), or the external contact pressures undergone during handling and installation at sea. A flexible pipe comprising an inner carcass is referred to as of rough bore type because the innermost element is the inner carcass that provides a rough passage due to the intervals between the metallic coils of the stapled strip.

The main purpose of the pressure vault is to enable the inner sealing sheath to withstand without bursting the pressure exerted by the petroleum fluid transported in the pipe, the outer face of the inner sealing sheath resting against the inner face of the pressure vault. The pressure vault also contributes to improving the collapse strength of the inner carcass, notably because it limits the possibilities of deformation of the inner carcass under the effect of the hydrostatic pressure.

The main purpose of the tensile armour layers is to take up longitudinal stresses, notably those related to the suspended weight of the flexible pipe when it is installed on the seabed from a pipe-laying vessel at the surface. In the case of a riser pipe permanently connecting an installation resting on the seabed to a surface floating equipment, these longitudinal stresses related to the suspended weight are exerted permanently. When the pipe is submerged at great depth, the longitudinal stresses related to the suspended weight during installation and/or service can reach several hundred tons.

The tensile armour layers are generally made of metal or a composite material. The metallic tensile armours conventionally used for axial reinforcement of the flexible pipes pose a weight problem at great depth. Indeed, according to the intended application, there is a depth beyond which the increase in the section of the steel armours increases the own weight of the line more than it increases the axial strength of the flexible pipe. The loading at the top of the riser during production or of the flowline during installation then exceeds the capacity thereof. Installing the line then becomes impossible since the suspended weight is greater than the capacity limit of taking up the stresses of the laying equipments.

Work has been carried out for several years now to replace these metal wires with composite material profiles, which afford the advantage of having a much lower density, and therefore mass, than metals. These composite profiles must meet, among other things, the recommendations of the normative document DNV-OS-0501 "Composite Components" (November 2013) published by Det Norske Veritas. The mass decrease obtained for the flexible structures has many consequences: it allows, with the same pipe-laying vessel, to install flexible pipes at greater depth; it also allows to use vessels of lower laying capacity, with potentially reduced installation costs; finally, the decrease in mass of the flexible pipes used as risers (lines connecting the sea bottom to the floating surface unit) can have an impact on the sizing of the floating units. On the other hand, composite tensile armours have a lower compressive strength than metal tensile armours, which poses a problem for loadings at the sea bottom dominated by a high external pressure.

The composite materials that are discussed here for the application of longitudinal armours are made of continuous reinforcement fibres (typically carbon, glass, aramid fibres, . . . ) embedded in a polymer resin (thermosetting, thermoplastic, . . . ). The current research work mainly focuses on a carbon-fibre composite material with an epoxy type thermosetting resin matrix, but this is not exclusive.

Even though it is possible to consider other manufacturing processes for this type of material, the one selected for manufacturing the composite armours is pultrusion, which allows to readily produce a product of very great length with the fibres oriented longitudinally so as to obtain the greatest strength in this direction. When there are only fibres oriented in the longitudinal direction, the composite is referred to as unidirectional.

The advantage of unidirectional composites is their very high mechanical strength in the direction of the fibres but, in contrast, their drawback is their low transverse strength. Indeed, although mainly stressed in the longitudinal direction, the armours of flexible pipes also undergo stresses in the transverse directions (transverse bending, compression in the thickness of the composite profile and torsion of the composite profile), both during manufacture of the flexible pipe upon winding of the armour wire and during service.

The transverse stresses undergone by the armours can result in longitudinal cracks, notably when the composite profile is applied onto the flexible pipe upon loading. Indeed, transverse loading stresses only the polymer matrix, which has a low elongation at break. FIGS. 1a and 1b respectively illustrate the initial configuration of the unidirectional composite profile and the application of the unidirectional composite profile onto the flexible pipe upon loading. In these figures, reference D2 designates the direction of applying the armour wire and reference D1 shows a transverse direction. For such a profile, an incipient crack AR may appear when applying the profile against the flexible pipe, notably on the outer surface of the armour.

BACKGROUND OF THE INVENTION

Patent EP-1,066,485 (equivalent WO-99/49,259) provides a solution for solving this transverse crack risk by adding a film on at least one face of the composite profile forming the armour. This film, also referred to as mat, is a layer of non-woven fibres which affords the advantage of having no preferential reinforcement direction and a low fibre volume ratio. The mat is added on at least one of the faces of the armour so as to reinforce it mechanically against the bending and torsional stresses undergone during the winding step, upon manufacture of the flexible pipe. Furthermore, the mat allows to improve the resistance of the armour to the abrasion process between profiles. For reasons of improved abrasion strength, but also for cost reasons, the mats used to date were made from aramid fibres.

There are two limitations to the use of mat layers for reinforcing unidirectional composites in the transverse directions:

the fibre volume ratio being low and the fibres being randomly oriented, the reinforcement effect of this layer is low, and it is all the lower as the thickness of the profile is great, and aramid fibres being hygroscopic, the environment of the annulus of the flexible pipes (presence of water, gas, high temperatures) may lead to a degradation of the properties of this layer during service.

To overcome these drawbacks, the present invention relates to a composite armour for a flexible pipe. The armour comprises a composite profile and a reinforcement tape. The composite profile consists of longitudinally oriented reinforcement fibres embedded in a polymer matrix. The reinforcement tape consists of a woven tape comprising fibres impregnated with a polymer material, in such a way that the weft thread of the reinforcement tape is orthogonal to the longitudinal direction of the profile, and the warp thread of the tape is parallel to the longitudinal direction of the profile. Thus, the reinforcement tape comprising fibres along these directions allows to improve the transverse behaviour of the armour and to prevent incipient cracks, while guaranteeing mechanical properties (notably longitudinal strength and transverse strength), a size and a mass suited to the constraints related to the manufacture and use of a flexible pipe.

SUMMARY OF THE INVENTION

The invention relates to an armour for a flexible pipe, comprising a composite profile and at least one reinforcement tape, said composite profile consisting of continuous reinforcement fibres embedded in a polymer resin, said composite profile having a substantially rectangular section and said reinforcement tape being secured to at least one face of said composite profile. Said reinforcement tape is a woven tape comprising fibres impregnated with a polymer material, in such a way that the weft thread of said reinforcement tape is substantially perpendicular to the longitudinal direction of said composite profile, and the warp thread of said reinforcement tape is substantially parallel to the longitudinal direction of said composite profile.

Advantageously, 50% to 90%, preferably 60% to 80% of said fibres of said reinforcement tape are included in said warp thread of said reinforcement tape.

Advantageously, the fibre volume ratio in said reinforcement tape is greater than 40% and it is preferably 60%.

According to an embodiment, said fibres of said reinforcement tape are carbon fibres.

According to an implementation, the thickness of said reinforcement tape ranges between 5% and 50% of the thickness of said armour, preferably between 10% and 30% of the thickness of said armour.

According to an aspect, said armour comprises a reinforcement tape arranged on the upper face of said composite profile.

According to a feature, said armour comprises two reinforcement tapes arranged on the upper and lower faces of said composite profile.

According to an option, said reinforcement tape is secured to said composite profile by cladding, gluing or simultaneous stratification with said polymer resin of said profile during manufacture of said composite profile.

According to an implementation, said armour has a longitudinal stiffness greater than 70% of that of the reference unidirectional armour, and preferably greater than 80%.

Preferably, the fibre volume ratio in said composite profile ranges between 50% and 80%.

According to an embodiment, said fibres of said composite profile are oriented only in the longitudinal direction of said composite profile.

Furthermore, the invention relates to a flexible pipe for petroleum fluid transport, said flexible pipe comprising at least one pressure sheath and at least one tensile armour layer including armours according to one of the above features, said armour layer being arranged outside said pressure sheath.

BRIEF DESCRIPTION OF THE FIGURES

Other features and advantages of the composite armour according to the invention will be clear from reading the description hereafter of embodiments given by way of non limitative example, with reference to the accompanying figures wherein.

DETAILED DESCRIPTION OF THE INVENTION

Figures 1A, 1B:
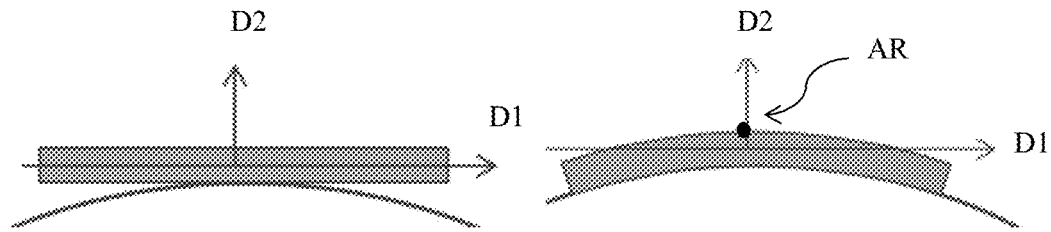
FIGS. 1a and 1b, already described, respectively illustrate the initial configuration of the unidirectional composite profile and the unidirectional composite profile applied onto a flexible pipe during loading.

The present invention relates to an armour for a flexible pipe, notably an armour withstanding tensile stresses or tensile armour. The armour comprises a composite profile and at least one reinforcement tape. An armour is understood to be a flat element whose length is very great in relation to the other dimensions: width and thickness. The armour can have a substantially rectangular section. The composite profile is also a flat element whose length is very great in relation to the other dimensions. The composite profile can have a substantially rectangular profile. According to the invention, the composite profile can be a unidirectional composite profile: the composite profile consists of threads or strands comprising a set of continuous reinforcement fibres embedded in a polymer resin, the reinforcement fibre strands being oriented only in the longitudinal direction of the profile. Thanks to the unidirectional composite, the composite profile and, a fortiori, the armour have a great mechanical strength in the direction of the fibres, i.e. in the longitudinal direction of the armour.

According to the invention, the reinforcement tape is secured to at least one face of the composite profile. Advantageously, the reinforcement tape can also be a flat element whose length is very great in relation to the other dimensions. The reinforcement tape can have a substantially rectangular section. The reinforcement tape is a woven tape comprising continuous fibres assembled in threads or strands, impregnated with a polymer material. According to the invention, the reinforcement tape is designed in such a way that the weft thread of the reinforcement tape is substantially perpendicular to the longitudinal direction of the composite material (in other words, the weft thread of the reinforcement tape is parallel to the width of the armour), and the warp thread of the reinforcement tape is substantially parallel to the longitudinal direction of the composite profile (in other words, the warp thread is parallel to the length of the armour). The weft thread is the thread of a fabric oriented in the direction of the width of the fabric (therefore of the reinforcement tape). In the opposite direction, the warp thread is oriented along the length of the fabric (therefore of the reinforcement tape). The fabric is made by interlacing these two threads. Such a reinforcement tape design allows to have fibres in the longitudinal direction and in the transverse direction, which allows to improve the transverse behaviour of the armour and to prevent incipient cracks while maintaining a great mechanical strength in the longitudinal direction of the armour. The reinforcement tape preferably covers the entire width of the composite profile. Besides, the reinforcement tape can extend over substantially the entire length of the composite profile.

In order to optimize the transverse strength of the armour, the distribution of the fibres in the reinforcement tape can be as follows:

50% to 90%, preferably 60% to 80% of the reinforcement tape fibres are included in the warp thread of the reinforcement tape, and 10% to 50%, preferably 20% to 40% of the reinforcement tape fibres are included in the weft thread of the reinforcement tape.

A low distribution value of the fibres in the warp thread of the reinforcement tape is more effective in terms of transverse reinforcement of the armour. However, weaving of the tape is more difficult and longer to perform, hence uneconomical.

The thickness of the reinforcement tape can vary to nearly the total thickness of the armour if the entire armour is to be reinforced in the transverse direction, but one may choose to preferably provide only part of the armour thickness with a tape. According to an embodiment, the thickness of the reinforcement tape can represent 5% to 50% of the total armour thickness, and preferably the thickness of the reinforcement tape represents 10% to 30% of the total armour thickness, so as to optimize the use of a unidirectional tape, notably for the longitudinal strength and for armour cost reasons. In another embodiment of the invention, the total thickness of the reinforcement tape is substantially equal to the thickness of the armour and it is made up of the superimposition of several layers of thickness less than the total thickness of said tape, so that the sum of the thicknesses of said layers is substantially equal to the thickness of the armour. This superimposition of layers can be seen as a superimposition of several reinforcement tapes of small thickness, some microns for example. For example, the superimposition comprises between one and ten layers, preferably between two and five layers.

According to a feature of the invention, the armour reinforced with a reinforcement tape can have a longitudinal stiffness greater than 70% of that of the reference unidirectional armour and preferably greater than 80%, so as to obtain good mechanical properties in the longitudinal direction of the armour. Stiffness is the characteristic indicating the resistance to elastic deformation of a body. Therefore, the thickness of the reinforcement tape and the distribution of the fibres in the direction of the warp thread can be selected so as to optimize the mechanical properties in the longitudinal direction of the armour while reinforcing it significantly in the transverse direction.

According to an embodiment of the invention, the volume ratio of fibres in the reinforcement tape can be greater than 40%, it can preferably range between 55% and 65%, and more preferably it can be substantially 60%. The fibre volume ratio is understood to be the ratio of the volume occupied by the fibres to the total volume of the reinforcement tape. Such a fibre volume ratio in the reinforcement tape allows to obtain good mechanical properties, and it allows the reinforcement tape to keep a protective and load transfer function. In particular, for a fibre volume ratio of 60%, a good compromise between the mechanical properties and the protective function of the reinforcement tape is obtained.

According to an embodiment of the invention, the fibres of the reinforcement tape can be glass, aramid, carbon, high-modulus polyethylene fibres, etc. For example, glass fibres allow carbon to be insulated and they prevent coupling with steels, and therefore galvanic corrosion. Aramid fibres also enable electrical insulation and they provide the armour with high tribological properties. Preferably, the fibres of the reinforcement tape can be carbon fibres for chemical inertia reasons, notably in the application for flexible pipes, for their good specific mechanical properties (in relation to the density thereof) and for economic reasons. Furthermore, carbon fibres help prevent degradation problems that may exist for aramid fibres, notably hygrothermal degradation.

Preferably, the strands (or threads) formed by assembling the fibres of the reinforcement tape have different diameters. The diameter of the strand depends on the number of fibres it consists of. Typically, a strand comprises several thousand fibres, this number of fibres being symbolized by the number of K. For example, a strand consisting of 12,000 fibres is referred to as "12K".

In the present invention, the diameter of the strands can for example range between 1K and 48K, preferably between 3K and 12K. Thus, the various "warp thread/weft thread" (or "weft thread/warp thread") pairs feasible to produce the reinforcement tape are for example of "3K/3K", "3K/6K", "3K/12K", "6K/6K", "6K/12K" and "12K/12K" type.

Advantageously, a weft thread of maximum diameter 6K is selected in order to facilitate weaving of the reinforcement tape.

The polymer material of the reinforcement tape with which the fibres are impregnated can be selected from among a thermoplastic or thermosetting polymer material. According to an example embodiment, the polymer material can be a resin of thermosetting type such as an epoxide resin, a vinylester resin, a cyanate resin, etc., or a resin of thermoplastic type such as a polyolefin, a polyamide, a fluoropolymer, a polyaryletherketone (PAEK), a polyphenylene sulfide (PPS), etc. Preferably, the polymer material selected for the reinforcement tape can be the same as that of the polymer resin of the unidirectional composite profile, which improves the cohesion of the assembly. Advantageously, in the embodiment of a reinforcement tape consisting of the superimposition of several layers, the same polymer material can be selected for each layer so as to improve the overall cohesion.

The composite profile can consist of continuous reinforcement fibres selected from among carbon, glass, aramid fibres embedded in a polymer resin, notably thermosetting or thermoplastic, in particular an epoxide, vinylester, cyanate, etc., resin, or a thermoplastic type resin such as a polyolefin, a polyamide, a fluoropolymer, a polyaryletherketone (PAEK), a polyphenylene sulfide (PPS), etc.

The volume ratio of fibres within the composite profile can range between 50% and 80%. This fibre volume ratio in the composite profile allows to meet the constraints imposed by flexible pipes, in particular in terms of longitudinal strength.

According to an embodiment of the invention, the tensile armour comprises two reinforcement tapes secured to the upper and lower faces of the composite profile. Thus, a trilayer armour is formed, this trilayer armour providing armour symmetry, and it requires no specific precautions upon setting to ensure that the armour is in the right direction.

When the armour comprises a single reinforcement tape (bilayer armour), the reinforcement tape is secured to the upper face of the composite profile. This embodiment with a single reinforcement tape provides simplified production of the armour and it allows to reinforce only the face of the composite profile that is likely to exhibit an incipient crack (see FIG. 1b).

According to an embodiment of the invention, a reinforcement tape can be secured to at least one lateral face (or to both lateral faces) of the composite profile. This structure provides mechanical protection of the composite profile against wear phenomena that may appear between the various composite profiles that make up the tensile armour layer.

According to an implementation of the invention, the reinforcement tape is secured to the composite profile by cladding, gluing or simultaneous stratification with the polymer resin of the profile during manufacture of the composite profile. Preferably, securing the reinforcement tape to the composite profile is done by simultaneous stratification of the various consecutive layers in order to optimize the cohesion of the various layers.

Advantageously, in the embodiment of the invention where the reinforcement tape is made up of the superimposition of several layers, the tape is also formed by simultaneous stratification.

Figure 2:
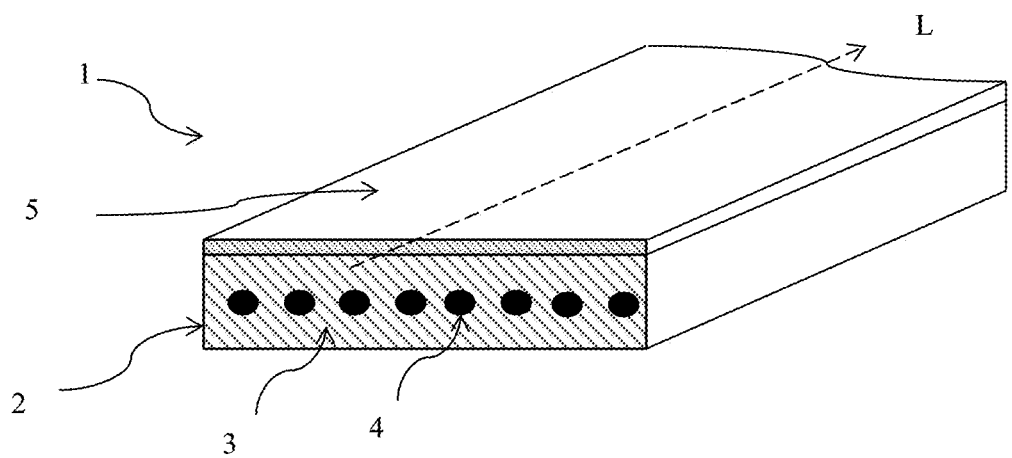
FIG. 2 illustrates an armour according to an embodiment of the invention.

FIG. 2 schematically illustrates, by way of non-limitative example, a tensile armour according to an embodiment of the invention. FIG. 2 is a three-dimensional partial view (the length of the armour is not shown in its entirety) of an armour 1. Armour 1 has a substantially rectangular section. Armour 1 comprises a composite profile 2 and a reinforcement tape 5. Composite profile 2 and reinforcement tape 5 have substantially rectangular sections. Composite profile 2 is a unidirectional composite profile whose fibres 4 are oriented longitudinally only, i.e. in the longitudinal direction L of armour 1. Fibres 4 are embedded in a polymer resin 3. Reinforcement tape 5 is secured to the upper face of composite profile 2. Reinforcement tape 5 comprises fibres impregnated with a polymer material. Reinforcement tape 5 is formed in such a way that the weft thread of reinforcement tape 5 is substantially perpendicular to longitudinal direction L of composite profile 2, and the warp thread of reinforcement tape 5 is parallel to the longitudinal direction of composite profile 2. Reinforcement tape 5 covers the entire length and width of composite profile 2.

Other alternative embodiments can be provided. For example, armour 1 can comprise a second reinforcement tape 5 secured to the lower face of composite profile 2.

Figure 3:
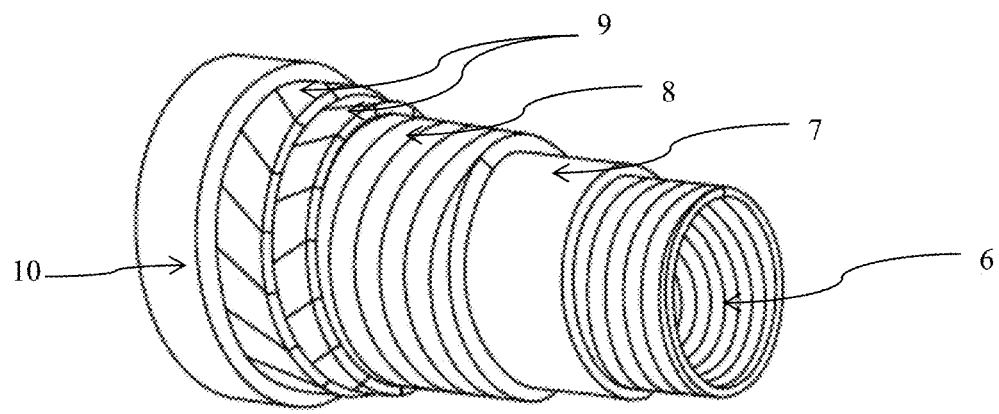
FIG. 3 illustrates a flexible pipe comprising an armour according to the invention.

A flexible pipe according to the prior art is schematically illustrated, by way of non-limitative example, in FIG. 3. This pipe consists of several layers described hereafter, from the inside to the outside of the pipe. The flexible pipe is of unbonded type and it meets the specifications defined in the normative document API 17J.

Inner carcass 6 consists of a metal strip helically wound with a short pitch. It is intended for collapse strength under the effect of the external pressure applied on the pipe.

Inner sealing sheath 7 is made by extrusion of a polymer material generally selected from among polyolefins, polyamides and fluoropolymers.

Pressure vault 8 made of stapled or interlocked metal wires provides internal pressure strength in the pipe.

According to the illustration of FIG. 3, tensile armour layers 9 consist of wires (armours) helically wound at angles whose absolute value with respect to the longitudinal axis of the flexible pipe ranges between 20 degrees and 55 degrees. The pipe advantageously comprises two superimposed and crossed layers of tensile armours 9, as shown in FIG. 3. For example, if the inner tensile armour layer is wound with a helix angle of 30 degrees, the outer tensile armour layer is wound with a helix angle of −30 degrees. This angular symmetry allows to provide torsional balance to the pipe, so as to reduce the tendency thereof to rotate under the effect of a tensile force.

When the two superimposed and crossed tensile armour layers 9 are wound with a helix angle substantially equal to 55 degrees, pressure vault 3 may optionally be removed because the 55-degree helix angle imparts good internal pressure strength to tensile armour layers 4.

Outer sealing sheath 10, also obtained by extrusion of a polymer material, provides an external protection to the pipe.

The pipe shown in FIG. 3 is of rough bore type, i.e. the fluid circulating in the pipe is in contact with inner carcass 6.

Alternatively, the pipe can be of smooth bore type. In this case, the pipe shown in FIG. 3 comprises no inner carcass 6. Polymer sheath 7 is directly in contact with the fluid circulating in the pipe. Polymer sheath 10 is sealed. The external pressure forces are supported by vault 8.

The invention further relates to a flexible pipe comprising at least one pressure sheath and at least one mechanical reinforcement element. In the present application, the term "mechanical reinforcement element" designates all the armour layers used to take up the longitudinal stresses of the flexible pipe. According to the invention, the flexible pipe comprises at least one armour layer including composite armours as described above. Furthermore, the flexible pipe according to the invention can advantageously comprise at least one of the other layers of the flexible pipe described in connection with FIG. 3, notably an inner carcass, an outer sealing sheath, a pressure vault and/or other additional layers. Preferably, the flexible pipe according to the invention is of unbonded type and it meets the specifications defined in the normative document API 17J.

Using composite armours according to the invention allows to make the flexible pipe lighter in relation to metallic armours. Besides, the longitudinal and transverse strength of the composite armours according to the invention allows to prevent armour breaking and degradation during use.

The present invention is suited for riser type flexible pipes, for flowline type flexible pipes and for oil offloading line (OOL) type flexible pipes allowing offloading of petroleum fluids between a floating production storage & offloading (FPSO) unit and an offloading buoy.

The invention is particularly well suited for a flexible pipe used at great depths, for which the pipe top tension is the most severe loading for dimensioning the armours.

Application Example

The features and advantages of the armour according to the invention will be clear from reading the application example hereafter.

The main application intended for the invention is an armour for a flexible pipe designed for petroleum fluid transport. This flexible pipe can run through a water depth by connecting bottomhole installations (well) and a surface platform (such a flexible pipe is referred to as riser). In deep sea, this pipe undergoes high mechanical stresses due to its weight and to the motion of the platform that is in this case always floating. Making this pipe lighter allows to reduce the stresses applied thereon and also to reduce the suspended weight to be supported by the platform. There are cases where the dimensions of the flexible pipe and the water depth are such that only a flexible pipe with composite armours can be envisaged, the top riser for example (i.e. the upper portion of the flexible pipe). In this example, it is a flexible pipe of inside diameter 9" (approximately 228.6 mm) dimensioned for an internal pressure in operation of 553 bar (approximately 55.3 MPa) and a water depth of 2140 m.

The critical loads to be supported by the top riser correspond to the top loading (connection with the platform) and the bottom loading (connection with the bottom riser, i.e. the lower portion of the flexible pipe). The top loading encompasses the internal pressure (line on production), the tension due to the suspended weight and the bending due to the platform motion, the latter two being not constant. The bottom loading encompasses the external pressure (depressurized line) and the tension due to the weight of the bottom riser, the sum thereof bringing the armours under compression as a result of the reverse bottom effect.

The solution provided by the prior art in this case is a flexible pipe with 4 unidirectional composite armour layers of section 14×1.65 mm, with a fibre volume ratio Vf=68%. Two new armour structures according to the invention are proposed here (section 14×2.08 mm, Vf=60% for the reinforcement tape and the composite profile):

Example 1 (not in accordance with the invention): one reinforcement tape, with a fibre distribution in the warp thread k=0.89 (89%), Example 2 (according to the invention): a trilayer successively consisting of a first reinforcement tape with k=0.7, a composite profile and a second reinforcement tape with k=0.7, the respective thicknesses of the three layers being 0.39, 1.30 and 0.39 mm, Example 3 (according to the invention): a bilayer successively consisting of a composite profile and a reinforcement tape with k=0.7, the respective thicknesses being 1.30 and 0.78 mm, and the reinforcement tape being arranged on the outer surface of the composite profile.

These solutions have been dimensioned to provide the same axial stiffness to the flexible pipe. For each solution, the stresses and the breaking factor R of the armours are calculated for the top and bottom loadings of the flexible pipe, by means of a numerical simulator allowing to fully take into account the multiaxial character of the loadings.

The maximum value of breaking factor R is given for the different solutions in Table 1. The thread is considered to be broken for R≥1. Factor R is calculated from the stress state and the breaking strength in each direction of the thread.

TABLE 1

Maximum breaking factor for the different armour structures

| Armour | $R_{max}$ |
|---|---|
| Prior art: unidirectional armour with Vf = 68% | 1.33 |
| Example 1 | 1.13 |
| Example 2 | 0.86 |
| Example 3 | 0.80 |

The fibre ratio reduction greatly decreases the value of $R_{max}$ in relation to the example of the armour according to the prior art, but it remains close to 1. However, using a trilayer, and particularly a bilayer, allows to further reduce the value of $R_{max}$ and to fall below 0.9, thus avoiding armour breaking.

Thus, reinforcing the current unidirectional composite profile with woven tapes or more generally fabrics allows to improve the transverse strength of the armour while maintaining satisfactory longitudinal properties. Notably, it is possible to sufficiently reinforce the armour so as to prevent longitudinal cracks.

The invention claimed is:

1. An armor for a flexible pipe, comprising a composite profile and at least one reinforcement tape, the composite profile comprising continuous reinforcement fibers embedded in a polymer resin, the composite profile having a substantially rectangular section and the reinforcement tape being secured to at least one face of the composite profile, wherein the reinforcement tape is a woven tape comprising fibers impregnated with a polymer material, in such a way that the weft thread of the reinforcement tape is substantially perpendicular to the longitudinal direction (L) of the composite profile, and the warp thread of the reinforcement tape is substantially parallel to the longitudinal direction (L) of the composite profile.

2. An armor as claimed in claim 1, wherein 50% to 90% of the fibers of the reinforcement tape are included in the warp thread of the reinforcement tape.

3. An armor as claimed in claim 1, wherein the fiber volume ratio of the reinforcement tape is greater than 40%.

4. An armor as claimed in claim 1, wherein the fibers of the reinforcement tape are carbon fibers.

5. An armor as claimed in claim 1, wherein the thickness of the reinforcement tape ranges between 5% and 50% of the thickness of the armor.

6. An armor as claimed in claim 1, wherein the armor comprises a reinforcement tape arranged on the upper face of the composite profile.

7. An armor as claimed in claim 1, wherein the armor comprises two reinforcement tapes arranged respectively on the upper and lower faces of the composite profile.

8. An armor as claimed in claim 1, wherein the reinforcement tape is secured to the composite profile by cladding, gluing or simultaneous stratification with the polymer resin of the profile during manufacture of the composite profile.

9. An armor as claimed in claim 1, wherein the armor has a longitudinal stiffness greater than 70% of that of a reference unidirectional armor.

10. An armor as claimed in claim 1, wherein the volume ratio of fibers in the composite profile ranges between 50% and 80%.

11. An armor as claimed in claim 1, wherein the fibers of the composite profile are oriented only in the longitudinal direction (L) of the composite profile.

12. A flexible pipe for petroleum effluent transport, the flexible pipe comprising at least one pressure sheath and at least one tensile armor layer including armors as claimed in claim 1, the armor layer being arranged outside the pressure sheath.

13. An armor as claimed in claim 1, wherein 60% to 80% of the fibers of the reinforcement tape are included in the warp thread of the reinforcement tape.

14. An armor as claimed in claim 1, wherein the fiber volume ratio of the reinforcement tape is 60%.

15. An armor as claimed in claim 1, wherein the fiber volume ratio of the reinforcement tape is between 55% and 65%.

16. An armor as claimed in claim 1, wherein the thickness of the reinforcement tape ranges between 10% and 30% of the thickness of the armor.

17. An armor as claimed in claim 1, wherein the armor has a longitudinal stiffness greater than 80% of that of a reference unidirectional armor.

\* \* \* \* \*